United States Patent
Hikida

(10) Patent No.: US 10,690,490 B2
(45) Date of Patent: Jun. 23, 2020

(54) METHOD OF DETECTING POSITIONAL DISPLACEMENT OF SAMPLE CONTAINER, IMAGE CAPTURING METHOD EMPLOYING SAME, AND SAMPLE CONTAINER POSITIONAL DISPLACEMENT DETECTING DEVICE

(71) Applicant: SCREEN HOLDINGS CO., LTD., Kyoto (JP)

(72) Inventor: Yuichiro Hikida, Kyoto (JP)

(73) Assignee: SCREEN HOLDINGS CO., LTD., Kyoto (JP)

( * ) Notice: Subject to any disclaimer, the term of this patent is extended or adjusted under 35 U.S.C. 154(b) by 28 days.

(21) Appl. No.: 16/317,453

(22) PCT Filed: Apr. 18, 2017

(86) PCT No.: PCT/JP2017/015551
§ 371 (c)(1),
(2) Date: Jan. 11, 2019

(87) PCT Pub. No.: WO2018/055823
PCT Pub. Date: Mar. 29, 2018

(65) Prior Publication Data
US 2019/0234730 A1    Aug. 1, 2019

(30) Foreign Application Priority Data
Sep. 21, 2016   (JP) .................................. 2016-183669

(51) Int. Cl.
*G01B 11/26*     (2006.01)
*G01B 11/14*     (2006.01)
(Continued)

(52) U.S. Cl.
CPC .............. *G01B 11/26* (2013.01); *G01B 11/00* (2013.01); *G01B 11/002* (2013.01); *G01B 11/14* (2013.01); *G06T 7/00* (2013.01); *G06T 7/33* (2017.01)

(58) Field of Classification Search
CPC .............................. G01B 11/26; G02B 3/0056
(Continued)

(56) References Cited

U.S. PATENT DOCUMENTS 9,530,053 B2 * 12/2016 Eckard ............... G06K 9/00624
2008/0144899 A1    6/2008 Varma et al.
(Continued)

FOREIGN PATENT DOCUMENTS

JP          10-027246 A      1/1998
JP         2000-174500 A     6/2000
(Continued)

OTHER PUBLICATIONS

Japanese Decision to Grant a Patent issued in corresponding Japanese Patent Application No. 2016-183669, dated Mar. 24, 2020, with English translation.
(Continued)

*Primary Examiner* — Roy M Punnoose
(74) *Attorney, Agent, or Firm* — McDermott Will & Emery LLP

(57) ABSTRACT

Two wells are selected and upper, lower, left, and right logical edge coordinates of the two wells are calculated. An image of a portion near each set of logical edge coordinates is captured, and a rectangular separability filter is applied to each captured image and for each captured image, coordinates of a center position of the rectangular separability filter obtained when a peak value of a separability is obtained are detected as temporary edge coordinates. Thereafter, actual center coordinates are calculated for each well selected, (Continued)

based on upper, lower, left, and right temporary edge coordinates. Finally, the amount of positional displacement of a well plate from an ideal placement state is calculated based on the center coordinates of the two wells selected.

12 Claims, 13 Drawing Sheets

(51) Int. Cl.
  *G01B 11/00* (2006.01)
  *G06T 7/33* (2017.01)
  *G06T 7/00* (2017.01)

(58) Field of Classification Search
  USPC ........................................................ 356/138
  See application file for complete search history.

(56) References Cited

U.S. PATENT DOCUMENTS

| | | |
|---|---|---|
| 2012/0212748 A1 | 8/2012 | Hollenbeck et al. |
| 2013/0100462 A1 | 4/2013 | Hollenbeck et al. |
| 2015/0235368 A1 | 8/2015 | Kakuma |
| 2020/0061769 A1* | 2/2020 | Liu .................... B23Q 17/2409 |

FOREIGN PATENT DOCUMENTS

| | | | |
|---|---|---|---|
| JP | 2000174500 A | * | 6/2000 |
| JP | 2014-048153 A | | 3/2014 |
| JP | 2014-532856 A | | 12/2014 |
| JP | 2015-152475 A | | 8/2015 |

OTHER PUBLICATIONS

Anoymous: "NIS-Elements: Well Plate Set Up Interface", Jul. 1, 2011 (Jul. 1, 2011), XP055666597, Retrieved from the Internet; URL:http://wk.ixueshu.com/i-jcjf/637b88ff3920ba33.html [retrieved on Feb. 10, 2020].

Fukui K: "Edge Extraction Method Based on Separability of Image Features", IEICE Transactions on Information and Systems, Information & Systems Society, Tokyo, JP, vol. E78-D, No. 12, Dec. 1, 1995 (Dec. 1, 1995), pp. 1533-1538.

Chris Marcellino et al: "WormAssay: A Navel Computer Application for Whole-Plate Motion-based Screening of Macroscopic Parasites," PLOS Neglected Tropical Diseases, vol. 6, No. 1,Jan. 31, 2012 (Jan. 31, 2012), p. e1494.

Extended European Search Report issued in corresponding European Patent Application No. 17852604.2-1210, dated Feb. 26, 2020.

International Search Report issued in corresponding International Patent Application No. PCT/JP2017/015551, dated Jul. 11, 2017, with English Translation.

\* cited by examiner

FIRST POSITIONAL DISPLACEMENT
DETECTION WELL

SECOND POSITIONAL DISPLACEMENT
DETECTION WELL

METHOD OF DETECTING POSITIONAL DISPLACEMENT OF SAMPLE CONTAINER, IMAGE CAPTURING METHOD EMPLOYING SAME, AND SAMPLE CONTAINER POSITIONAL DISPLACEMENT DETECTING DEVICE

CROSS REFERENCE

This application is the U.S. National Phase under 35 U.S.C. § 371 of International Application No. PCT/JP2017/015551, filed on Apr. 18, 2017, which claims the benefit of Japanese Application No. 2016-183669, filed on Sep. 21, 2016, the entire contents of each are hereby incorporated by reference.

TECHNICAL FIELD

The present invention relates to a method of detecting positional displacement occurring when a sample container such as a well plate is placed on a stage.

BACKGROUND ART

Conventionally, in the medical and drug discovery fields, and the like, cells, etc., that are cultured in a sample container called a "well plate", a "microplate", etc., are observed as samples. A plurality of concave sample storage portions called wells are formed in such a sample container. In general, samples are filled in the wells together with liquid medium. In recent years, image capturing of such samples by an imaging device having a CCD camera, etc., mounted thereon and observation of the samples using image data obtained by the image capturing have been performed. For example, in cancer drug discovery research, by capturing, by the imaging device, images of cancer cells filled in the wells together with a liquid (culture fluid) serving as medium, observation and analysis of the cancer cells are performed.

FIG. 23 is a perspective view showing an example of a well plate 20. In the example shown in FIGS. 23, 24 wells 21 are provided in the well plate 20. When image capturing by an imaging device is performed, such a well plate 20 is placed (set) in a predetermined position on a stage by an operator. More specifically, a holder 121 for holding the well plate 20 is formed in a stage 12, for example, as shown in FIG. 24, and the well plate 20 is placed in the holder 121 by the operator.

Meanwhile, normally, the operator places the well plate 20 such that a corner of the well plate 20 matches a corner of the holder 121 as shown in a portion indicated by reference character 90 in FIG. 25. By this, the well plate 20 is held in the holder 121 in an ideal state, and a desired captured image can be obtained. However, for example, when the operator roughly places the well plate 20 or when some kind of external force is applied to the well plate 20 before starting image capturing, the well plate 20 may not be held in the holder 121 in the ideal state upon the start of image capturing. For example, as shown in FIG. 26, upon the start of image capturing, the well plate 20 may be placed in an obliquely dislocated state from the ideal state (a turned state from the ideal state). If image capturing is performed in such a state in which positional displacement has occurred, a desired captured image cannot be obtained, e.g., an image of a range different than a desired range is obtained.

For a technique that deals with positional displacement such as that described above, for example, there is known a technique using pattern matching (hereinafter, referred to as "first conventional technique"). In the first conventional technique, an actual center position of a well is found by performing pattern matching, such as normalized correlation, using a captured image obtained in a state in which positional displacement has occurred, and a pre-registered template image. In addition, according to a technique disclosed in Japanese Laid-Open Patent Publication No. H10-27246 (hereinafter, referred to as "second conventional technique"), the centers of gravity of feature locations in binarized images which are obtained by binarizing a captured image and a template image are found, and an angle and the amount of parallel displacement between the captured image and the template image are found based on regression lines which are obtained from the respective arrangements of the centers of gravity.

PRIOR ART DOCUMENT

Patent Document

[Patent Document 1] Japanese Laid-Open Patent Publication No. H10-27246

SUMMARY OF THE INVENTION

Problems to be Solved by the Invention

However, according to the first conventional technique and the second conventional technique, for example, a captured image of a well changes due to the growth of cells being cultured, or the brightness of a captured image changes depending on the amount of culture fluid. As such, since stable captured images cannot be obtained and the robustness is low, positional displacement cannot be detected with high accuracy. In addition, since there has been an increase in the resolution of an imaging device used in the medical and drug discovery fields, and the like, there is a tendency of increase in the amount of data of an image obtained by image capturing of a well. Hence, when techniques using a template image are adopted such as the first conventional technique and the second conventional technique, there are concerns in the future about the compression and shortage of storage capacity or an increase in processing time.

An object of the present invention is therefore to provide a method of detecting positional displacement of a sample container placed on an imaging device, at high speed and with high accuracy without increasing the amount of data required for a process.

Means for Solving the Problems

A first aspect of the present invention is directed to a method of detecting positional displacement of a sample container, the method detecting an amount of positional displacement of a sample container having a plurality of sample storage portions from an ideal placement state for when the sample container is placed in a sample container holding portion of an imaging device, and the method including:

a sample storage portion selecting step of selecting two sample storage portions from among the plurality of sample storage portions, as positional displacement detection sample storage portions;

a logical edge coordinates calculating step of calculating logical edge coordinates for each positional displacement detection sample storage portion, the logical edge coordinates being coordinates of an upper edge, a lower edge, a left edge, and a right edge in the ideal placement state;

an image capturing step of performing image capturing of a predetermined range with each set of logical edge coordinates being a center position, the each set of logical edge coordinates being calculated in the logical edge coordinates calculating step;

a temporary edge coordinates detecting step of applying, for each positional displacement detection sample storage portion, a separability filter to each of captured images of an upper edge side, a lower edge side, a left edge side, and a right edge side obtained by the image capturing in the image capturing step, while shifting a center position of the separability filter, and detecting, for each captured image, coordinates of the center position of the separability filter obtained when a peak value of a separability is obtained, as temporary edge coordinates, the separability filter finding a separability between two regions;

a center coordinates calculating step of calculating actual center coordinates for each positional displacement detection sample storage portion, based on the temporary edge coordinates for the upper edge side, the lower edge side, the left edge side, and the right edge side detected in the temporary edge coordinates detecting step; and an amount-of-positional-displacement calculating step of calculating an amount of positional displacement of the sample container from the ideal placement state, based on the center coordinates of each positional displacement detection sample storage portion calculated in the center coordinates calculating step.

According to a second aspect of the present invention, in the first aspect of the present invention, the sample container has a rectangular shape, and when a group of sample storage portions arranged in line in a longitudinal direction of the sample container is defined as a row, in the sample storage portion selecting step, two sample storage portions belonging to a same row and arranged in positions farthest from each other are selected as the positional displacement detection sample storage portions.

According to a third aspect of the present invention, in the first aspect of the present invention, in the temporary edge coordinates detecting step, a rectangular separability filter that finds a separability between two rectangular regions is used as the separability filter.

According to a fourth aspect of the present invention, in the third aspect of the present invention, in the temporary edge coordinates detecting step, when detecting temporary edge coordinates for the upper edge side or the lower edge side of each positional displacement detection sample storage portion, a separability is found while allowing a center position of the rectangular separability filter to move on a straight line that connects logical edge coordinates for the upper edge side of the positional displacement detection sample storage portion to logical edge coordinates for the lower edge side of the positional displacement detection sample storage portion, and when detecting temporary edge coordinates for the left edge side or the right edge side of the positional displacement detection sample storage portion, a separability is found while allowing the center position of the rectangular separability filter to move on a straight line that connects logical edge coordinates for the left edge side of the positional displacement detection sample storage portion to logical edge coordinates for the right edge side of the positional displacement detection sample storage portion.

According to a fifth aspect of the present invention, in the first aspect of the present invention, in the amount-of-positional-displacement calculating step, an amount of parallel displacement and an angle are calculated as the amount of positional displacement, the amount of parallel displacement representing a magnitude of displacement between a predetermined reference position of the sample container in the ideal placement state and the reference position of the sample container in a state in which the sample container is actually placed in the sample container holding portion, and the angle representing an inclination of the sample container in the state in which the sample container is actually placed in the sample container holding portion, with respect to the ideal placement state.

According to a sixth aspect of the present invention, in the fifth aspect of the present invention, when one of the two sample storage portions selected in the sample storage portion selecting step is defined as a first positional displacement detection sample storage portion and another is defined as a second positional displacement detection sample storage portion, center coordinates of the first positional displacement detection sample storage portion and center coordinates of the second positional displacement detection sample storage portion in the ideal placement state are defined as first ideal center coordinates and second ideal center coordinates, respectively, and the center coordinates of the first positional displacement detection sample storage portion and the center coordinates of the second positional displacement detection sample storage portion calculated in the center coordinates calculating step are defined as first actual center coordinates and second actual center coordinates, respectively, in the amount-of-positional-displacement calculating step, an amount of parallel displacement and an angle are calculated as the amount of positional displacement, the amount of parallel displacement representing a magnitude of displacement between the first ideal center coordinates and the first actual center coordinates, and the angle being formed by a straight line that connects the first ideal center coordinates to the second ideal center coordinates and a straight line that connects the first actual center coordinates to the second actual center coordinates.

According to a seventh aspect of the present invention, in the first aspect of the present invention, when there is a captured image with which a peak value of the separability cannot be normally obtained in the temporary edge coordinates detecting step, the imaging device displays an alert.

An eighth aspect of the present invention is directed to an image capturing method for capturing an image of a sample container having a plurality of sample storage portions by an imaging device, the image capturing method including:

an adjusting step of adjusting a state of the imaging device to a state for starting image capturing, based on an amount of positional displacement obtained using a method of detecting positional displacement in the fifth aspect of the present invention; and a sample container's image capturing step of capturing an image of the sample container.

According to a ninth aspect of the present invention, in the eighth aspect of the present invention, an imaging unit provided in the imaging device is configured to be movable, in an amount-of-positional-displacement calculating step, an amount of parallel displacement and an angle are calculated as the amount of positional displacement, the amount of parallel displacement representing a magnitude of displacement between a predetermined reference position of the sample container in an ideal placement state and the reference position of the sample container in a state in which the sample container is actually placed in a sample container holding portion, and the angle representing an inclination of the sample container in the state in which the sample container is actually placed in the sample container holding portion, with respect to the ideal placement state, in the adjusting step, an image capturing start position of the imaging unit is adjusted based on the amount of parallel displacement calculated in the amount-of-positional-displacement calculating step, and in the sample container's image capturing step, an image of the sample container is captured while allowing the imaging unit to move according to the angle calculated in the amount-of-positional-displacement calculating step.

According to a tenth aspect of the present invention, in the eighth aspect of the present invention, the sample container holding portion is configured to be movable and rotatable, in the amount-of-positional-displacement calculating step, an amount of parallel displacement and an angle are calculated as the amount of positional displacement, the amount of parallel displacement representing a magnitude of displacement between a predetermined reference position of the sample container in an ideal placement state and the reference position of the sample container in a state in which the sample container is actually placed in the sample container holding portion, and the angle representing an inclination of the sample container in the state in which the sample container is actually placed in the sample container holding portion, with respect to the ideal placement state, in the adjusting step, rotation of the sample container holding portion is performed based on the angle calculated in the amount-of-positional-displacement calculating step, and movement of the sample container holding portion is performed based on the amount of parallel displacement calculated in the amount-of-positional-displacement calculating step, and in the sample container's image capturing step, an image of the sample container is captured while allowing the sample container holding portion to move relative to an imaging unit provided in the imaging device.

According to an eleventh aspect of the present invention, in the eighth aspect of the present invention, an imaging unit provided in the imaging device is configured to be movable, the sample container holding portion is configured to be movable and rotatable, in the amount-of-positional-displacement calculating step, an amount of parallel displacement and an angle are calculated as the amount of positional displacement, the amount of parallel displacement representing a magnitude of displacement between a predetermined reference position of the sample container in an ideal placement state and the reference position of the sample container in a state in which the sample container is actually placed in the sample container holding portion, and the angle representing an inclination of the sample container in the state in which the sample container is actually placed in the sample container holding portion, with respect to the ideal placement state, in the adjusting step, rotation of the sample container holding portion is performed based on the angle calculated in the amount-of-positional-displacement calculating step, and movement of the sample container holding portion is performed based on the amount of parallel displacement calculated in the amount-of-positional-displacement calculating step, and in the sample container's image capturing step, an image of the sample container is captured while allowing the imaging unit to move.

A twelfth aspect of the present invention is directed to a sample container positional displacement detecting device that detects an amount of positional displacement of a sample container having a plurality of sample storage portions from an ideal placement state for when the sample container is placed in a sample container holding portion, the device including:

a sample storage portion selecting means for selecting two sample storage portions from among the plurality of sample storage portions, as positional displacement detection sample storage portions;

a logical edge coordinates calculating means for calculating logical edge coordinates for each positional displacement detection sample storage portion, the logical edge coordinates being coordinates of an upper edge, a lower edge, a left edge, and a right edge in the ideal placement state;

an image capturing means for performing image capturing of a predetermined range with each set of logical edge coordinates being a center position, the each set of logical edge coordinates being calculated by the logical edge coordinates calculating means;

a temporary edge coordinates detecting means for applying, for each positional displacement detection sample storage portion, a separability filter to each of captured images of an upper edge side, a lower edge side, a left edge side, and a right edge side obtained by the image capturing by the image capturing means, while shifting a center position of the separability filter, and detecting, for each captured image, coordinates of the center position of the separability filter obtained when a peak value of a separability is obtained, as temporary edge coordinates, the separability filter finding a separability between two regions;

a center coordinates calculating means for calculating actual center coordinates for each positional displacement detection sample storage portion, based on the temporary edge coordinates for the upper edge side, the lower edge side, the left edge side, and the right edge side detected by the temporary edge coordinates detecting means; and an amount-of-positional-displacement calculating means for calculating an amount of positional displacement of the sample container from the ideal placement state, based on the center coordinates of each positional displacement detection sample storage portion calculated by the center coordinates calculating means.

Effects of the Invention

According to the first aspect of the present invention, the actual center coordinates of two sample storage portions (positional displacement detection sample storage portions) used to detect positional displacement of a sample container are calculated based on temporary edge coordinates detected by applying a separability filter to captured images of regions near edges. Here, the coordinates of a center position of the separability filter obtained when a peak value of a separability is obtained in a process using the separability filter serve as temporary edge coordinates. Regardless of the states of cells or culture fluid in a sample storage portion, the maximum separability is obtained when the center position of the separability filter is present near an edge of the sample storage portion. Therefore, when similar positional displacement has occurred, regardless of the states of cells or culture fluid in the sample storage portion, certain coordinates are detected as temporary edge coordinates. That is, even if stable captured images cannot be obtained due to the differences in the amount of culture fluid between image capturing targets, the growth of cells, etc., temporary edge coordinates are detected with high accuracy. Since the actual center coordinates of the two sample storage portions are found based on such temporary edge coordinates, the amount of positional displacement is calculated with high accuracy. In addition, captured images that are required to detect positional displacement are only captured images of regions near the edges at eight locations in total, and a process using a template image is not performed. Hence, positional displacement can be detected at high speed without increasing the amount of data required for a process. As described above, it becomes possible to detect positional displacement of the sample container placed in the sample container holding portion of the imaging device, at high speed and with high accuracy without increasing the amount of data required for a process.

According to the second aspect of the present invention, the accuracy of detection of positional displacement is increased.

According to the third aspect of the present invention, temporary edge coordinates are detected without the need of a complex process.

According to the fourth aspect of the present invention, the accuracy of detection of temporary edge coordinates is increased.

According to the fifth aspect of the present invention, since the amount of parallel displacement and an angle are calculated as the amount of positional displacement, the imaging device can be allowed to operate to obtain a desired captured image, based on results of the calculation.

According to the sixth aspect of the present invention, the same effect as that of the fifth aspect of the present invention can be obtained.

According to the seventh aspect of the present invention, when the degree of positional displacement of the sample container is large, for example, an operator can be prompted to redo placement of the sample container in the sample container holding portion.

According to the eighth aspect of the present invention, image capturing of the sample container is performed considering the positional displacement of the sample container. Hence, even if positional displacement has occurred in the sample container upon performing image capturing of the sample container, a desired captured image can be obtained without performing wasteful image capturing.

According to the ninth aspect of the present invention, even if positional displacement has occurred in the sample container upon performing image capturing of the sample container, a desired captured image can be obtained without the need to redo placement of the sample container in the sample container holding portion by the operator. In addition, when positional displacement has occurred in the sample container, image capturing by the imaging unit is performed without moving the sample container, and thus, a desired captured image can be obtained without damaging cells, etc.

According to the tenth aspect of the present invention, even if positional displacement has occurred in the sample container upon performing image capturing of the sample container, a desired captured image can be obtained without the need to redo placement of the sample container in the sample container holding portion by the operator.

According to the eleventh aspect of the present invention, the same effect as that of the tenth aspect of the present invention can be obtained.

According to the twelfth aspect of the present invention, the same effect as that of the first aspect of the present invention can be obtained.

MODE FOR CARRYING OUT THE INVENTION

Figure 1:
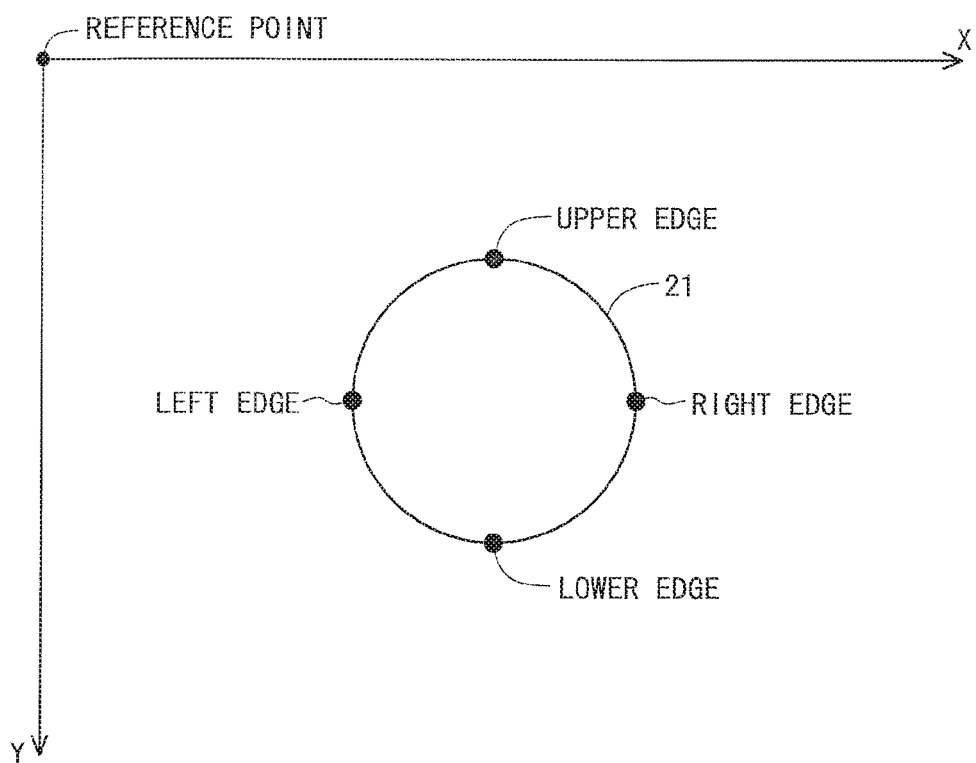
FIG. 1 is a diagram for describing an edge of a well.

One embodiment of the present invention will be described below with reference to the accompanying drawings. Note that in the following description it is assumed that "the origin of a coordinate system is present at an upper left corner, and when a well plate 20 is ideally placed in a holder 121, a longitudinal direction of the well plate 20 is parallel with an X-axis and a transverse direction of the well plate 20 is parallel with a Y-axis". In addition, although in general the entire edge portion (rim portion) of a well 21 (for example, in the case of a circular well, the entire circle forming the outer shape) is called an "edge", in the following description, for each well 21, as shown in FIG. 1, an edge portion with the smallest Y-coordinate is referred to as "upper edge", an edge portion with the largest Y-coordinate is referred to as "lower edge", an edge portion with the smallest X-coordinate is referred to as "left edge", and an edge portion with the largest X-coordinate is referred to as "right edge". In addition, for convenience sake, the "upper edge", "lower edge", "left edge", and "right edge" are collectively referred to as "end edges".

<1. Configuration of an Imaging Device>

Figure 2:
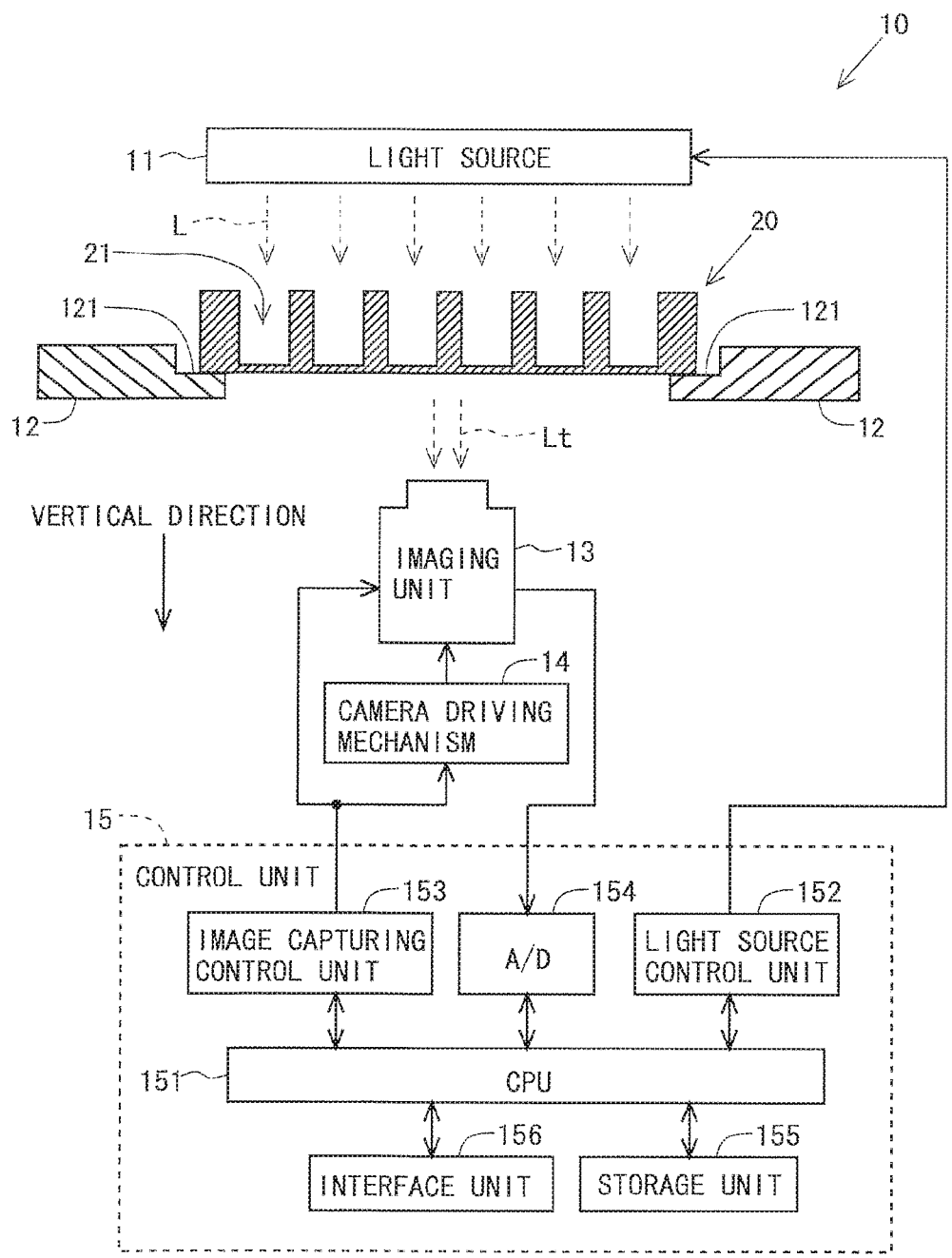
FIG. 2 is a diagram showing a configuration of an imaging device according to one embodiment of the present invention.

FIG. 2 is a diagram showing a configuration of an imaging device 10 according to one embodiment of the present invention. The imaging device 10 is a device for capturing images of samples of cells, colonies of cells, bacteria, etc., (hereinafter, these are collectively referred to as "cells, etc.") which are cultured in wells 21 formed in a well plate 20 serving as a sample container. The well plate 20 has a plate-like shape. In the well plate 20 there are arranged a plurality of (e.g., 6, 24, 96, or 384) wells 21, each serving as a sample storage portion having an opening on the topside thereof and having a transparent bottom on the underside thereof. For the shape of the wells 21, typically, the cross section is circular and the bottom is flat. Note, however, that the cross sectional and bottom shapes of the wells 21 are not limited thereto. In each well 21 is filled a predetermined amount of liquid (culture fluid) serving as medium that provides cells, etc., with a growth environment. The amount of liquid filled in each well 21 is generally on the order of 50 to 200 microliters.

Figure 24:
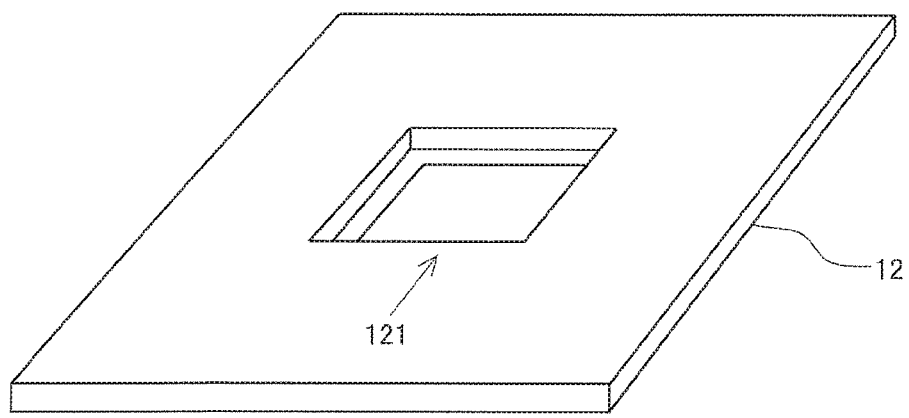
FIG. 24 is a diagram for describing a holder for holding the well plate.
Figure 25:
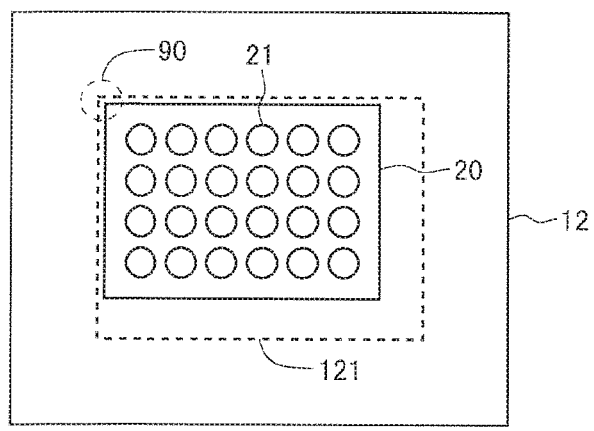
FIG. 25 is a diagram for describing an ideal placement state of the well plate.
Figure 26:
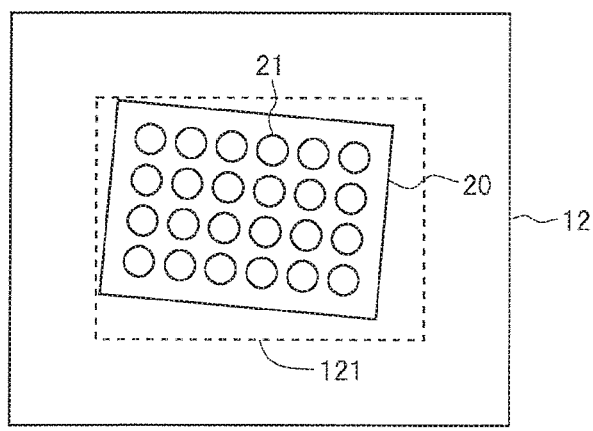
FIG. 26 is a diagram showing the well plate placed in an obliquely dislocated state from the ideal placement state.

As shown in FIG. 2, the imaging device 10 includes a light source 11 that emits light for image capturing; a stage 12 on which the well plate 20 is placed; an imaging unit 13 that captures images of samples (cells, etc.) in the wells 21; a camera driving mechanism 14 that allows the imaging unit 13 to move upon image capturing; and a control unit 15 that controls the operation of the light source 11, the imaging unit 13, and the camera driving mechanism 14. As shown in FIG. 24, a holder 121 for holding the well plate 20 upon image capturing is formed in the stage 12. Note that a sample container holding portion is implemented by the holder 121. The light source 11 is disposed at the top of the imaging device 10. The stage 12 is disposed below the light source 11, and the imaging unit 13 is disposed below the stage 12.

The light source 11 irradiates the wells 21 with light L from above the well plate 20 held in the holder 121, based on a control instruction that is provided from a light source control unit 152 in the control unit 15. The irradiation light L is visible light and is typically white light. Note that image capturing may be performed in a state in which light of a specific color is emitted by allowing red, green, and blue light sources to individually light up.

When performing image capturing by the imaging device 10, the well plate 20 including the plurality of wells 21 that hold samples (cells, etc.) and medium is held in the holder 121 formed in the stage 12. The holder 121 abuts on an underside rim portion of the well plate 20 and holds the well plate 20 in a substantially horizontal position.

The imaging unit 13 receives transmitted light Lt that is emitted from the light source 11 and transmitted below the well plate 20 held in the holder 121, and thereby captures an image of the well plate 20. The imaging unit 13 is coupled to the camera driving mechanism 14, and horizontally moves along the underside of the well plate 20 by the operation of the camera driving mechanism 14. That is, the imaging unit 13 can perform scan movement along the underside of the well plate 20. Note, however, that the configuration may be any as long as relative movement between the imaging unit 13 and the well plate 20 is implemented, and the well plate 20 may be allowed to move upon image capturing by adopting a configuration using a movable stage 12. Note that although FIG. 2 shows that the light source 11 irradiates the entire surface of the well plate 20 with light, only wells 21 whose images are to be captured by the imaging unit 13 may be irradiated with light. In addition, the light source 11 may move in synchronization with the imaging unit 13.

The camera driving mechanism 14 allows the imaging unit to move in a horizontal direction, based on a control instruction that is provided from an image capturing control unit 153 in the control unit 15.

The control unit 15 includes a CPU 151, the light source control unit 152, the image capturing control unit 153, an AD converter (A/D) 154, a storage unit 155, and an interface unit 156. The CPU 151 performs control of the operation of each component in the control unit 15 and various computing processes. The light source control unit 152 controls the lighting state of the light source 11. The image capturing control unit 153 controls the operation of the imaging unit 13 and the camera driving mechanism 14 such that an image of an image capturing target is captured according to a predetermined scan movement recipe. The AD converter (A/D) 154 receives an image signal (analog data) obtained by image capturing by the imaging unit 13, and converts the image signal to digital image data. The storage unit 155 holds the digital image data. Based on the digital image data, the CPU 151 performs appropriate image processing. The interface unit 156 has, for example, a function of accepting operation inputs from an operator, a function of displaying information such as processing results to the operator, and a function of performing data communication with other devices through a communication line. Note that to the interface unit 156 are connected an input accepting unit (a keyboard, a mouse, etc.) that accepts operation inputs, a display unit that displays information, the communication line, etc.

<2. Positional Displacement Detection Process>

The imaging device 10 according to the present embodiment performs a positional displacement detection process that detects how far the well plate 20 deviates in the holder 121 from an ideal placement state (detects the amount of parallel displacement and an angle). Then, image capturing for obtaining a target captured image is performed considering the amount of parallel displacement and angle detected in the positional displacement detection process. Note that the positional displacement detection process is performed, for example, by the CPU 151 executing a program for a positional displacement detection process which is held in the storage unit 155 in the control unit 15.

Figure 3:
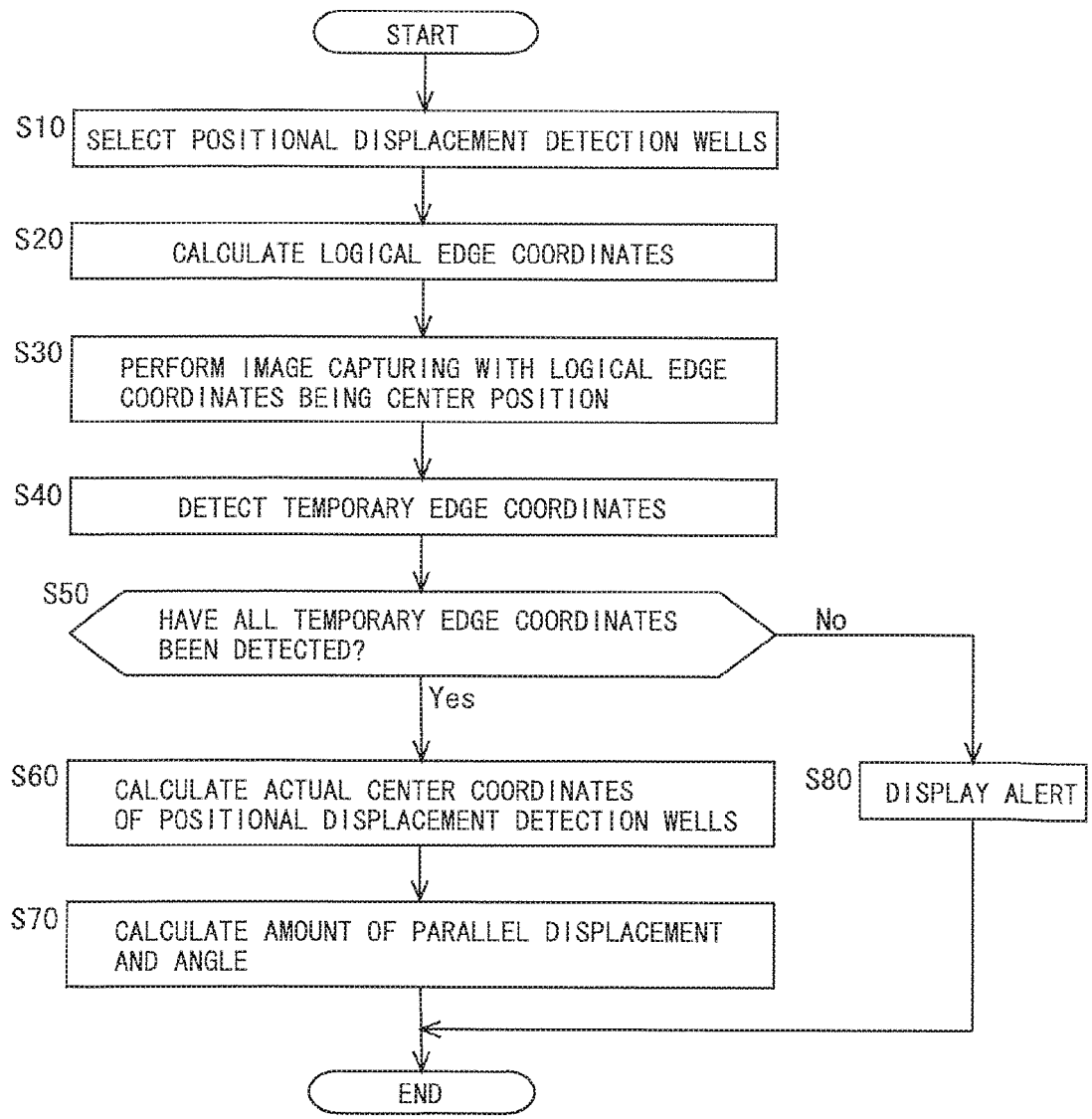
FIG. 3 is a flowchart showing a procedure of a positional displacement detection process in the embodiment.
Figure 23:
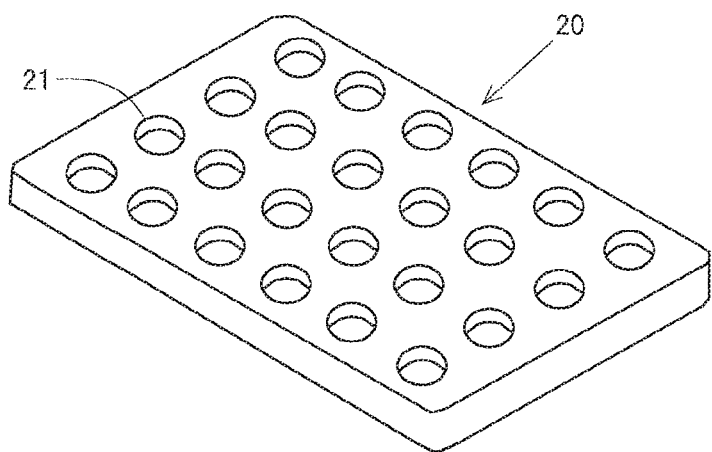
FIG. 23 is a perspective view showing an example of a well plate.

FIG. 3 is a flowchart showing a procedure of a positional displacement detection process of the present embodiment. First, two wells 21 used in the positional displacement detection process are selected (step S10). Note, however, that the configuration may be such that three or more wells 21 are selected and the amount of positional displacement (the amount of parallel displacement and an angle) is found at a step which will be described later, based on information on wells 21 whose center coordinates are normally calculated, or may be such that the most probable result from among multiple results of calculation of the amount of positional displacement which are obtained based on the center coordinates of a plurality of wells 21 is adopted as a result of detection of the amount of positional displacement (the amount of parallel displacement and an angle). The wells 21 selected at this step S10 are hereinafter referred to as "positional displacement detection wells". In general, the shape of the well plate 20 is, as shown in FIG. 23, rectangular. Here, a group of wells 21 arranged in line in the longitudinal direction is defined as a "row", and a group of wells 21 arranged in line in the transverse direction is defined as a "column". In step S10, any two wells 21 in the well plate 20 can be selected as positional displacement detection wells, but in terms of increasing the accuracy of detection of positional displacement, it is preferred to select, as positional displacement detection wells, two wells 21 belonging to the same row and arranged in positions farthest from each other.

Figure 4:
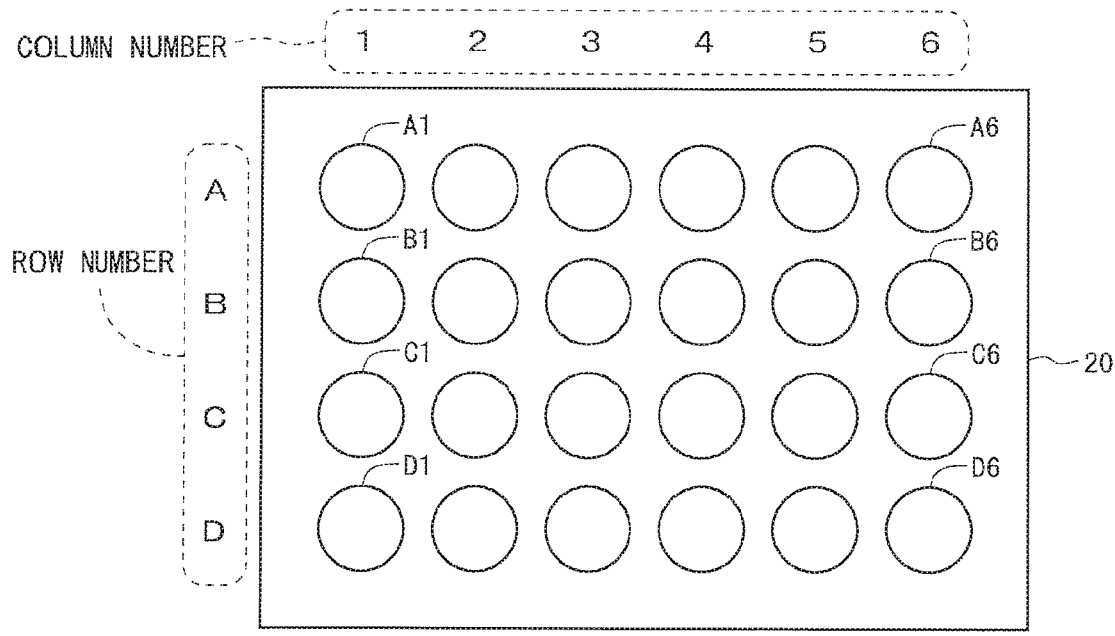
FIG. 4 is a diagram for describing selection of positional displacement detection wells in the embodiment.

For example, regarding a well plate 20 having 24 wells 21, it is assumed that row numbers and column numbers are assigned as shown in FIG. 4. Note that in FIG. 4 a well is given a reference character in which a row number and a column number are combined. In the case of an example shown in FIG. 4, in terms of increasing the accuracy of detection of positional displacement, as positional displacement detection wells, a well A1 and a well A6 may be selected, or a well B1 and a well B6 may be selected, or a well C1 and a well C6 may be selected, or a well D1 and a well D6 may be selected.

Meanwhile, the storage unit 155 in the control unit 15 of the imaging device 10 holds, for each type (model) of well plate 20, a definition file that describes information such as the number of wells 21, the size of the wells 21, and a spacing between two adjacent wells 21. Based on the definition files, it can be predetermined, for each type of well plate 20, which two wells 21 are to be selected as positional displacement detection wells. Therefore, when the positional displacement detection process is actually performed, predetermined two wells 21 may be selected as positional displacement detection wells, depending on the type of a well plate 20 held in the holder 121 (information on the type is inputted to the control unit 15 upon the start of operation). Note, however, that the configuration may be such that positional displacement detection wells are selected by the operator when the positional displacement detection process is actually performed.

Note that in step S20 to S60 which will be described below, the same processes are performed on the two positional displacement detection wells. Thus, in the following, processes will be described focusing on one positional displacement detection well.

Figure 5:
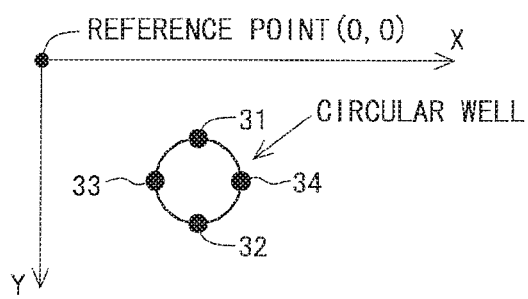
FIG. 5 is a diagram for describing calculation of logical edge coordinates for a case in which a circular well is adopted in the embodiment.
Figure 6:
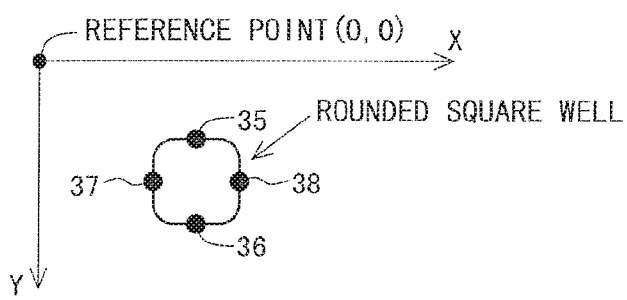
FIG. 6 is a diagram for describing calculation of logical edge coordinates for a case in which a rounded square well is adopted in the embodiment.

After selecting positional displacement detection wells, the logical edge coordinates of each positional displacement detection well are calculated (step S20). Note that the logical edge coordinates are the coordinates (an X-coordinate and a Y-coordinate) of the end edges of the well 21 for when the well plate 20 is placed in the holder 121 in an ideal state. That is, in step S20, for each positional displacement detection well, the coordinates of each of the upper edge, lower edge, left edge, and right edge (see FIG. 1) in an ideal placement state are found. For example, when a circular well is adopted, the coordinates of edge portions at four locations (an upper edge 31, a lower edge 32, a left edge 33, and a right edge 34) such as those shown in FIG. 5 are found. In addition, for example, when a rounded square well (a well having a roughly square shape with four arc corners) is adopted, the coordinates of edge portions at four locations (an upper edge 35, a lower edge 36, a left edge 37, and a right edge 38) such as those shown in FIG. 6 are found. Note that logical edge coordinates can be calculated based on the information in the above-described definition files.

Then, image capturing of a predetermined range is performed with each set of logical edge coordinates calculated in step S20 being a center position (step S30). Since image capturing with logical edge coordinates being a center position is thus performed, the coordinates of a center position of a captured image obtained in step S30 match the logical edge coordinates. The image capturing range in step S30 is set to an appropriate size so that temporary edge coordinates can be suitably found in step S40 which will be described later. Note that since four sets of logical edge coordinates are found for each positional displacement detection well in step S20, image capturing is performed at four locations for each positional displacement detection well at this step S30. That is, for each positional displacement detection well, a captured image of a region near the upper edge, a captured image of a region near the lower edge, a captured image of a region near the left edge, and a captured image of a region near the right edge are obtained.

Then, a process of detecting, using a rectangular separability filter 40 (see FIG. 7), coordinates that are required to calculate the center coordinates of each positional displacement detection well in step S60 which will be described later is performed (step S40). Note that the coordinates detected at this step S40 are, as will be described later, coordinates on an edge of the actual positional displacement detection well or coordinates very near those coordinates. Therefore, the coordinates detected at this step S40 are referred to as "temporary edge coordinates" for convenience sake. Note that although a process of detecting temporary edge coordinates is performed for each of an upper edge side, a lower edge side, a left edge side, and a right edge side, here, a process will be described focusing on the upper edge side.

Figure 7:
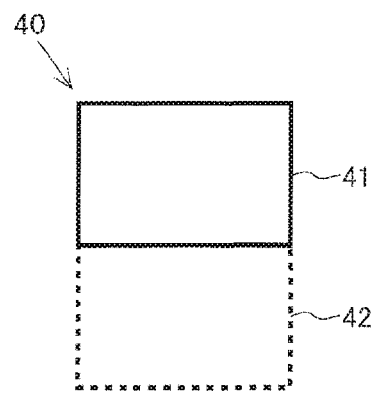
FIG. 7 is a diagram for describing a rectangular separability filter in the embodiment.

The rectangular separability filter 40 is a filter for finding a separability between two regions in an image. Upon calculation of a separability using the rectangular separability filter 40, two rectangular regions (a first region 41 and a second region 42) such as those shown in FIG. 7 are considered. Then, with the rectangular separability filter 40 being disposed in a desired position in the image, a separability μ between two regions (the first region 41 and the second region 42) in the position is calculated using the following equations (1) to (3):

[Expression 1]

$$\mu = \frac{\sigma_b^2}{\sigma_T^2} \quad (1)$$

[Expression 2]

$$\sigma_b^2 = n_1(\overline{P_1} - \overline{P_m})^2 + n_2(\overline{P_2} - \overline{P_m})^2 \quad (2)$$

[Expression 3]

$$\sigma_T^2 = \sum_{i=1}^{N}(P_1 - \overline{P_m})^2 \quad (3)$$

Regarding the above equations (1) to (3), N represents the total number of pixels of the two regions (the first region 41 and the second region 42), $n_1$ represents the number of pixels in the first region 41, $n_2$ represents the number of pixels in the second region 42, $\sigma_T$ represents the total variance value of the two regions, $P_i$ represents the luminance value of a position i, $P_1$ bar represents the average luminance value of the first region 41, $P_2$ bar represents the average luminance value of the second region 42, and $P_m$ bar represents the average luminance value of the two regions.

Figure 8:
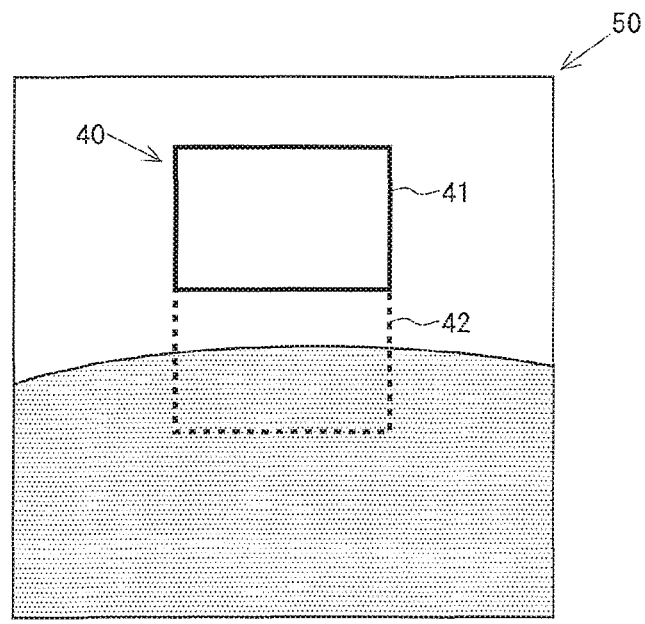
FIG. 8 is a diagram for describing calculation of a separability using the rectangular separability filter in the embodiment.

In the present embodiment, by disposing the rectangular separability filter 40 on a captured image (an image obtained by the image capturing in step S30) 50, for example, as shown in FIG. 8, a separability μ in a state in which the rectangular separability filter 40 is thus disposed is found.

Figure 9:
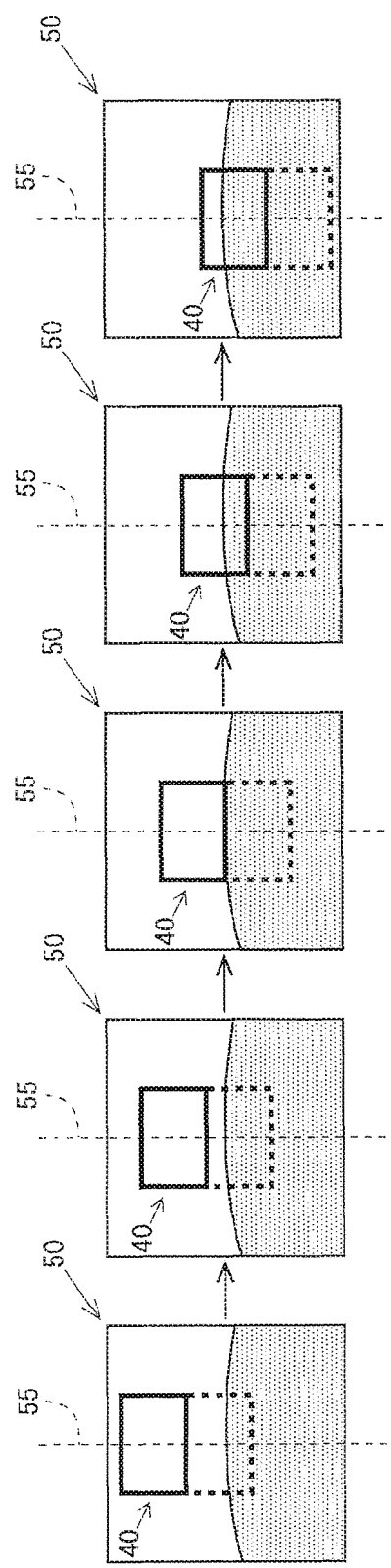
FIG. 9 is a diagram for describing movement of the rectangular separability filter upon detecting temporary edge coordinates in the embodiment.
Figure 10:
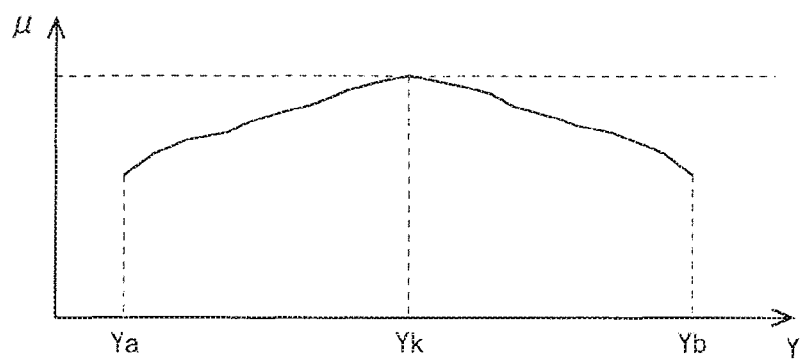
FIG. 10 is a diagram representing results of calculation of separabilities by a graph in the embodiment.

When detecting temporary edge coordinates, while a separability μ for each position is found, the center position of the rectangular separability filter 40 is allowed to move little by little on a straight line 55 that connects the logical edge coordinates of the upper edge to the logical edge coordinates of the lower edge, as shown in FIG. 9. By this, separabilities μ for the respective positions on the straight line 55 are obtained depending on the movement intervals of the rectangular separability filter 40. The results of calculation of separabilities μ are schematically represented by a graph such as that shown in FIG. 10 in which a horizontal axis is the Y-coordinate and a vertical axis is the separability μ. In FIG. 10, a Y-coordinate of a position in which the calculation of the separability μ starts is represented as Ya, and a Y-coordinate of a position in which the calculation of the separability μ ends is represented as Yb. Note that although the values of obtained separabilities μ are represented by a continuous line in FIG. 10, discrete values depending on the movement intervals of the rectangular separability filter 40 are actually obtained.

In an example shown in FIG. 10, the maximum separability μ is obtained when the Y-coordinate is Yk. In other words, the peak value of the separability μ is a value obtained when the Y-coordinate is Yk. Hence, in this example, a Y-coordinate of temporary edge coordinates is Yk. Since the center position of the rectangular separability filter 40 moves on the straight line 55 that connects the logical edge coordinates of the upper edge to the logical edge coordinates of the lower edge as described above, an X-coordinate of the temporary edge coordinates is the same as an X-coordinate of the logical edge coordinates of the upper edge. In this manner, the coordinates of the center position of the rectangular separability filter 40 obtained when the peak value of the separability μ is obtained are detected as temporary edge coordinates. Note that the reason why the coordinates at which the peak value of the separability μ is obtained are used as temporary edge coordinates is that since the luminance value greatly differs between the inside of the well 21 and the outside of the well 21, it is considered that an actual edge is present in a position in which the maximum separability μ is obtained or a position very near that position. From the above fact, the temporary edge coordinates detected at this step S40 are coordinates on an edge of the actual positional displacement detection well or coordinates very near those coordinates.

In step S40, in the above-described manner, temporary edge coordinates are found for each of the upper edge side, the lower edge side, the left edge side, and the right edge side. Note that when detecting temporary edge coordinates for the left edge side or the right edge side, an X-coordinate of the temporary edge coordinates is found by a process using the rectangular separability filter 40. At this time, a Y-coordinate of the temporary edge coordinates is the same as a Y-coordinate of the logical edge coordinates of the left edge/right edge.

Figure 11:
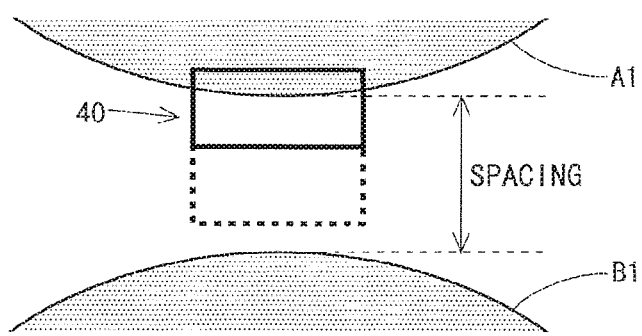
FIG. 11 is a diagram for describing detection of temporary edge coordinates for a lower edge side of a well indicated by reference character A1 in FIG. 4 in the embodiment.
Figure 12:
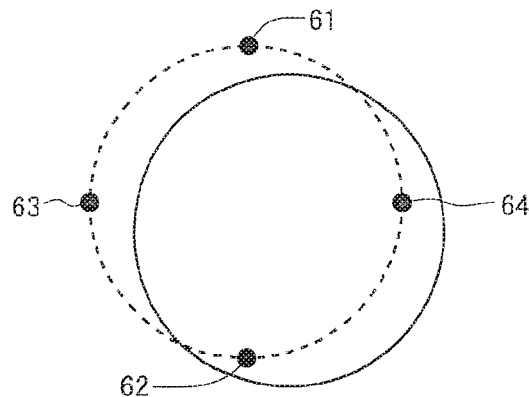
FIG. 12 is a diagram for describing detection of temporary edge coordinates in the embodiment.

Meanwhile, there is a concern that depending on the spacing between two adjacent wells 21, detection of temporary edge coordinates is not suitably performed. For example, there is a concern that detection of temporary edge coordinates for the lower edge side and the right edge side is not suitably performed in a case in which the well indicated by reference character A1 in FIG. 4 is selected as a positional displacement detection well. However, normally, a sufficient spacing is provided between two wells 21, and by setting the size of the rectangular separability filter 40 to an appropriate size, for example, as shown in FIG. 11, detection of temporary edge coordinates is suitably performed.

After completing step S40, it is determined whether all temporary edge coordinates required to calculate the actual center coordinates of the two positional displacement detection wells which are selected in step S10 have been detected (step S50). That is, it is determined whether all of four sets of temporary edge coordinates for one positional displacement detection well and four sets of temporary edge coordinates for the other positional displacement detection well have been normally detected in step S40. If, as a result of the determination, there is even a single set of temporary edge coordinates that have not been detected, processing proceeds to step S80. On the other hand, if all temporary edge coordinates required to calculate the actual center coordinates of the two positional displacement detection wells have been detected in step S40, processing proceeds to step S60.

Meanwhile, as described above, by a process using the rectangular separability filter 40 (the process in step S40), results that can be represented by a graph such as those shown in FIG. 10 can be obtained as the results of calculation of separabilities μ for the respective positions. Regarding this, in the example shown in FIG. 10, a peak value of the separability μ is present in a position where the Y-coordinate is Yk. However, there is also a case in which a peak value of the separability μ cannot be detected when, for example, the degree of positional displacement is very large. That is, there is also a case in which there is a captured image (an image obtained by the image capturing in step S30) with which a peak value of the separability μ cannot be normally obtained. In such a case, at the above-described step S50, it is determined that "there are temporary edge coordinates that have not been detected".

In step S80, an alert message (e.g., a message prompting redoing the placement of the well plate 20 in the holder 121) is displayed on the display unit (not shown) connected to the interface unit 156 in the control unit 15 of the imaging device 10. Then, this positional displacement detection process ends. At this time, image capturing considering positional displacement is not performed.

In step S60, the actual center coordinates of each positional displacement detection well are calculated using the temporary edge coordinates detected in step S40. Specifically, an X-coordinate of the coordinates of a midpoint between temporary edge coordinates for the left edge side and temporary edge coordinates for the right edge side is determined to be an X-coordinate of actual center coordinates, and a Y-coordinate of the coordinates of a midpoint between temporary edge coordinates for the upper edge side and temporary edge coordinates for the lower edge side is determined to be a Y-coordinate of the actual center coordinates. In this manner, in step S60, the actual center coordinates (an X-coordinate and a Y-coordinate) of one positional displacement detection well and the actual center coordinates (an X-coordinate and a Y-coordinate) of the other positional displacement detection well are found.

Figure 13:
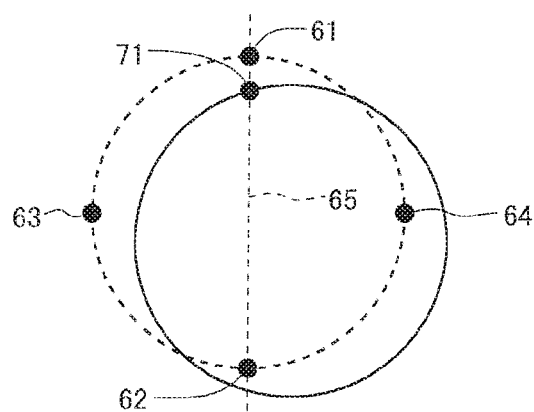
FIG. 13 is a diagram for describing detection of temporary edge coordinates in the embodiment.
Figure 14:
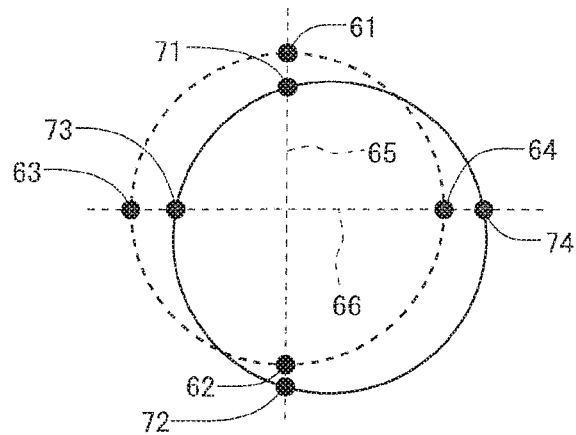
FIG. 14 is a diagram for describing detection of temporary edge coordinates in the embodiment.

Now, with reference to FIGS. 12 to 17, the processes in step S40 and step S60 will be specifically described. In FIGS. 12 to 17, an ideal placement state of a positional displacement detection well is represented by a dotted line, and an actual placement state of the positional displacement detection well is represented by a solid line. In addition, in FIGS. 12 to 14, four sets of logical edge coordinates are represented by reference characters 61 to 64. In this example, as shown in FIG. 13, temporary edge coordinates 71 which are coordinates at which the maximum separability μ is obtained at the upper edge side are found from coordinates on a straight line 65 that connects the logical edge coordinates 61 of an upper edge to the logical edge coordinates 62 of a lower edge. Likewise, as shown in FIG. 14, temporary edge coordinates 72 which are coordinates at which the maximum separability μ is obtained at the lower edge side are found. In addition, as shown in FIG. 14, temporary edge coordinates 73 which are coordinates at which the maximum separability μ is obtained at the left edge side and temporary edge coordinates 74 which are coordinates at which the maximum separability μ is obtained at the right edge side are found from coordinates on a straight line 66 that connects the logical edge coordinates 63 of a left edge to the logical edge coordinates 64 of a right edge. In the above-described manner, the four sets of temporary edge coordinates 71 to 74 are found.

Figure 15:
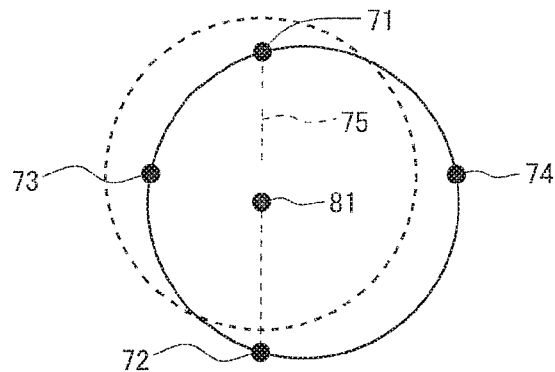
FIG. 15 is a diagram for describing calculation of actual center coordinates of a positional displacement detection well in the embodiment.
Figure 16:
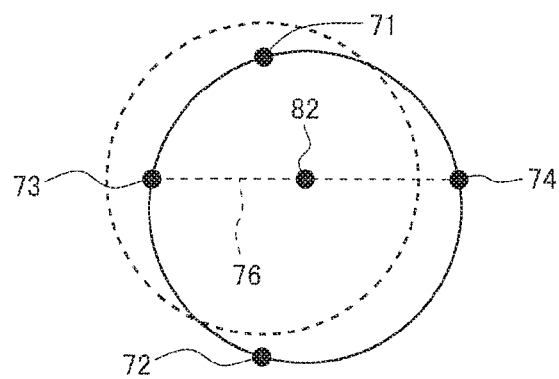
FIG. 16 is a diagram for describing calculation of actual center coordinates of the positional displacement detection well in the embodiment.
Figure 17:
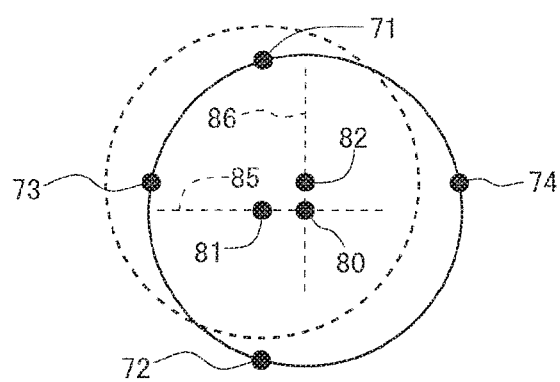
FIG. 17 is a diagram for describing calculation of actual center coordinates of the positional displacement detection well in the embodiment.

Then, as shown in FIG. 15, coordinates 81 of a midpoint of a line segment 75 that connects the temporary edge coordinates 71 for the upper edge side to the temporary edge coordinates 72 for the lower edge side are found. In addition, as shown in FIG. 16, coordinates 82 of a midpoint of a line segment 76 that connects the temporary edge coordinates 73 for the left edge side to the temporary edge coordinates 74 for the right edge side are found. Then, as shown in FIG. 17, coordinates 80 of a point of intersection of a straight line 85 passing through the coordinates 81 and parallel with the X-axis and a straight line 86 passing through the coordinates 82 and parallel with the Y-axis are determined to be the actual center coordinates of the positional displacement detection well. As such, an X-coordinate of the actual center coordinates is found based on an X-coordinate of the temporary edge coordinates 73 for the left edge side and an X-coordinate of the temporary edge coordinates 74 for the right edge side, and a Y-coordinate of the actual center coordinates is found based on a Y-coordinate of the temporary edge coordinates 71 for the upper edge side and a Y-coordinate of the temporary edge coordinates 72 for the lower edge side.

Figure 18:
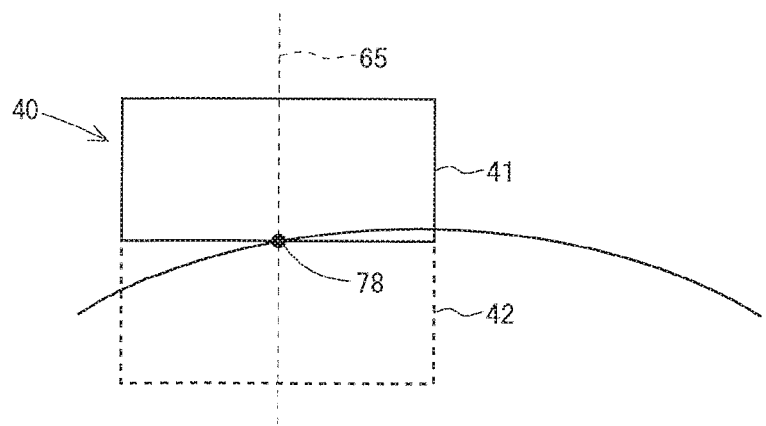
FIG. 18 is a diagram for describing the fact that even if temporary edge coordinates are the coordinates of a position different than a position on an edge of an actual positional displacement detection well, the actual center coordinates of the positional displacement detection well are accurately detected in the embodiment.
Figure 19:
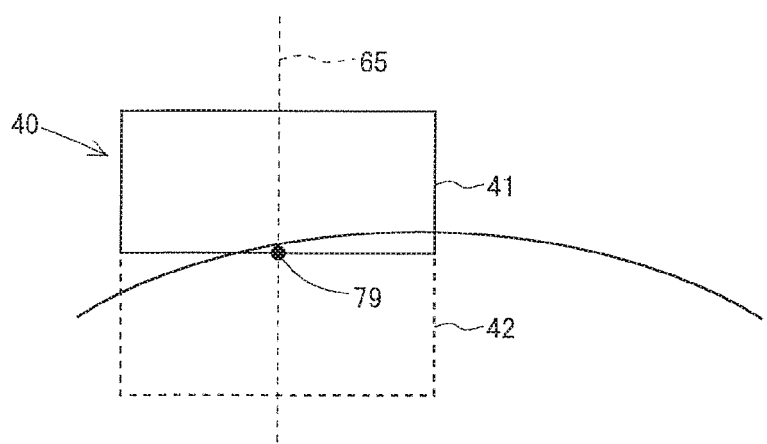
FIG. 19 is a diagram for describing the fact that even if temporary edge coordinates are the coordinates of a position different than a position on an edge of an actual positional displacement detection well, the actual center coordinates of the positional displacement detection well are accurately detected in the embodiment.

Meanwhile, for example, when a circular well is adopted, a portion near an end edge (e.g., a portion near an upper edge) has an arc shape. In addition, when there is positional displacement in the X-axis direction, a straight line that connects the logical edge coordinates of an upper edge to the logical edge coordinates of a lower edge does not pass through an upper edge of an actual positional displacement detection well. From the above fact, when calculating, for example, temporary edge coordinates for the upper edge side using the rectangular separability filter 40, the separability μ may not take a peak value at coordinates 78 (see FIG. 18) of a point of intersection of a straight line 65 that connects the logical edge coordinates of the upper edge to the logical edge coordinates of the lower edge and an edge of the actual positional displacement detection well. That is, coordinates 79 of a position different than a position on the edge of the actual positional displacement detection well may serve as temporary edge coordinates (see FIG. 19). Regarding this, when temporary edge coordinates for the upper edge side are coordinates inside the edge of the actual positional displacement detection well, temporary edge coordinates for the lower edge side are also coordinates inside the edge of the actual positional displacement detection well, and when temporary edge coordinates for the upper edge side are coordinates outside the edge of the actual positional displacement detection well, temporary edge coordinates for the lower edge side are also coordinates outside the edge of the actual positional displacement detection well. Therefore, even if the temporary edge coordinates for the upper edge side and the lower edge side are the coordinates of positions different than positions on the edge of the actual positional displacement detection well, a Y-coordinate of actual center coordinates of the positional displacement detection well is accurately detected. Likewise, even if the temporary edge coordinates for the left edge side and the right edge side are the coordinates of positions different than positions on the edge of the actual positional displacement detection well, an X-coordinate of the actual center coordinates of the positional displacement detection well is accurately detected. Note that upon finding temporary edge coordinates for the upper edge side and upon finding temporary edge coordinates for the lower edge side, the rectangular separability filter 40 is used in opposite orientations (180-degree rotated state), and upon finding temporary edge coordinates for the left edge side and upon finding temporary edge coordinates for the right edge side, the rectangular separability filter 40 is used in opposite orientations (180-degree rotated state).

After calculating the actual center coordinates of each positional displacement detection well, the amount of parallel displacement and an angle which represent the degree of positional displacement are calculated (step S70). More specifically, in step S70, as the amount of positional displacement, the amount of parallel displacement representing the magnitude of displacement between a reference position of the well plate 20 in an ideal placement state and a reference position of the well plate 20 in a state in which the well plate 20 is actually placed in the holder 121, and an angle representing the inclination of the well plate 20 in the state in which the well plate 20 is actually placed in the holder 121, with respect to the ideal placement state, are calculated. Note that the amount of parallel displacement includes the amount of displacement for the X-coordinate and the amount of displacement for the Y-coordinate.

Figure 20:
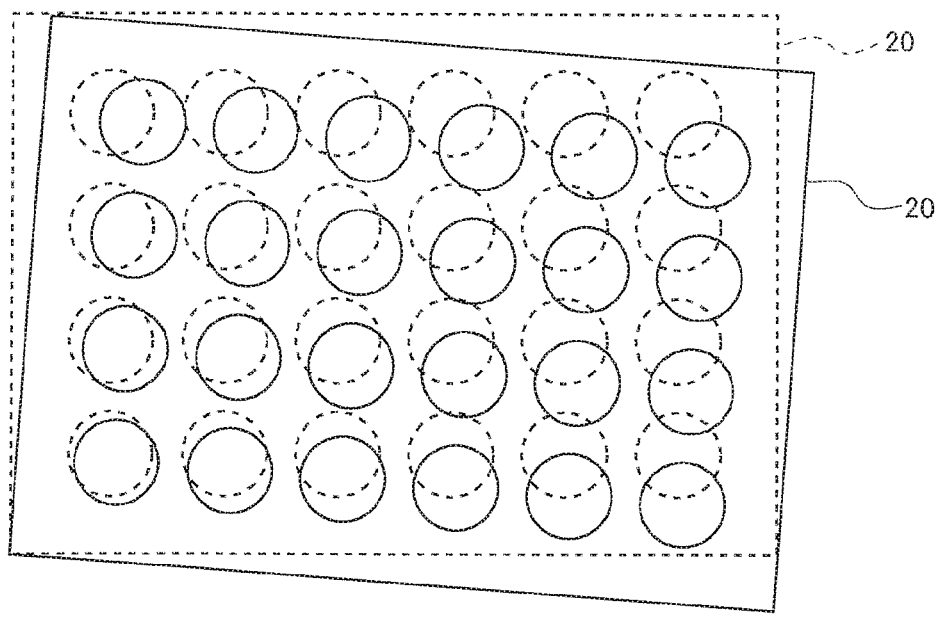
FIG. 20 is a diagram for describing calculation of the amount of parallel displacement and an angle which represent the degree of positional displacement in the embodiment.
Figure 21:
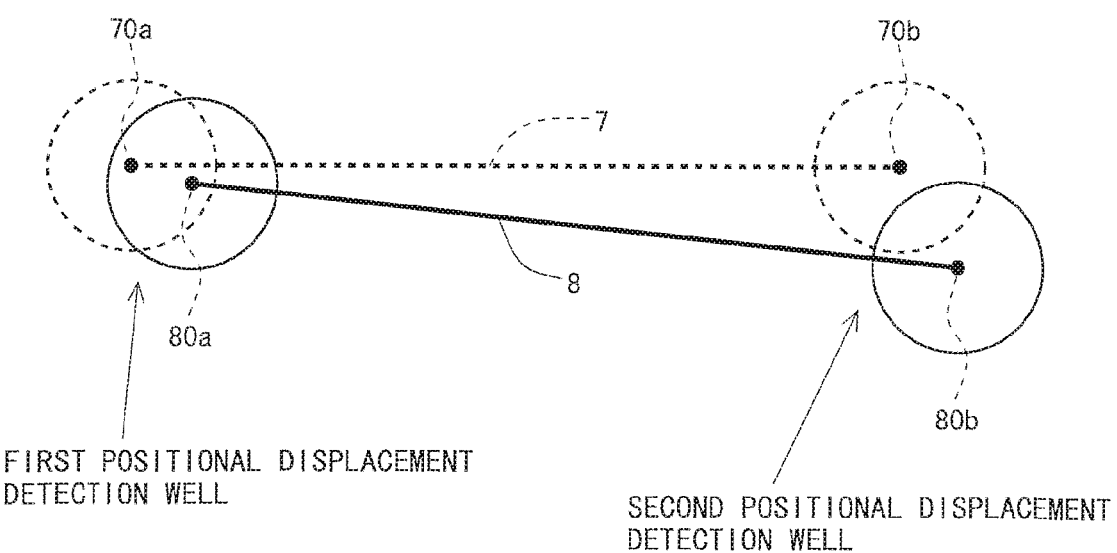
FIG. 21 is a diagram for describing calculation of the amount of parallel displacement and an angle which represent the degree of positional displacement in the embodiment.

With reference to FIGS. 20 and 21, calculation of the amount of positional displacement (the amount of parallel displacement and an angle) will be more specifically described. Here, an example case is shown in which, as indicated by a solid line in FIG. 20, the well plate 20 is placed in the holder 121 in an obliquely dislocated state from an ideal placement state (a state indicated by a broken line). Note that, here, as shown in FIG. 21, a positional displacement detection well closer to a reference point (see FIG. 1) is referred to as "first positional displacement detection well" and a positional displacement detection well farther from the reference point is referred to as "second positional displacement detection well".

The amount of parallel displacement is found only for either one of the first positional displacement detection well and the second positional displacement detection well. For example, the amount of parallel displacement is found only for the first positional displacement detection well. Note, however, that the amounts of parallel displacement for both the first positional displacement detection well and the second positional displacement detection well may be found. When taking a look at the first positional displacement detection well, center coordinates 70a for when the well plate 20 is ideally placed can be found from the above-described definition file. In addition, actual center coordinates 80a of the first positional displacement detection well are calculated in step S60. Based on the two sets of center coordinates 70a and 80a, the amount of displacement for the X-coordinate and the amount of displacement for the Y-coordinate are found.

An angle is calculated using an equation representing a straight line 7 that connects the center coordinates 70a and 70b of the two positional displacement detection wells obtained when the well plate 20 is ideally placed, and an equation representing a straight line 8 that connects the actual center coordinates 80a and 80b of the two positional displacement detection wells. Here, it is assumed that the straight line 7 is represented by the following equation (4) and the straight line 8 is represented by the following equation (5):

$$y = a_1 x + b_1 \quad (4)$$

$$y = a_2 x + b_2 \quad (5)$$

At this time, an angle θ formed by the straight line 7 and the straight line 8 is calculated based on the following equation (6):

[Expression 4]

$$\tan \theta = \pm \frac{a_2 - a_1}{1 + a_2 \times a_1} \quad (6)$$

Note, however, that for the straight line 7, it is assumed that $a_1$ in the above equation (4) is 0. In this case, the following equation (7) holds true for the angle θ formed by the straight line 7 and the straight line 8:

[Expression 5]

$$\tan \theta = \pm a_2 \quad (7)$$

In the above-described manner, in step S70, the amount of parallel displacement and the angle which represent the degree of positional displacement of the well plate 20 from the ideal placement state are calculated.

Note that, in the present embodiment, a sample storage portion selecting step is implemented by step S10, a logical edge coordinates calculating step is implemented by step S20, an image capturing step is implemented by step S30, a temporary edge coordinates detecting step is implemented by step S40, a center coordinates calculating step is implemented by step S60, and an amount-of-positional-displacement calculating step is implemented by step S70.

<3. Image Capturing Considering Positional Displacement>

Figure 22:
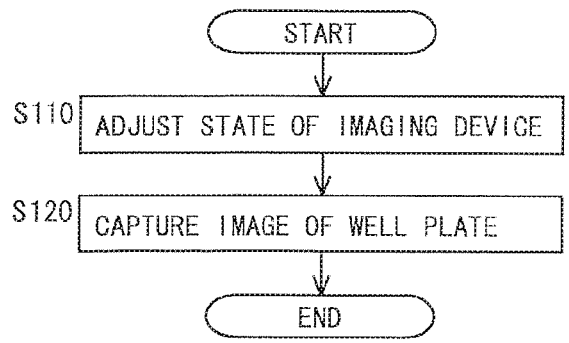
FIG. 22 is a flowchart showing an image capturing procedure performed after detecting the amount of positional displacement in the embodiment.

After a positional displacement detection process such as that described above ends, image capturing considering positional displacement is performed. FIG. 22 is a flowchart showing an image capturing procedure performed after detecting the amount of positional displacement. After detecting the amount of positional displacement (the amount of parallel displacement and an angle) by a positional displacement detection process, first, a process of adjusting the state of the imaging device 10 to a state for starting image capturing is performed (step S110). Specifically, an image capturing start position is adjusted. In the imaging device 10 according to the present embodiment, the stage 12 is in a fixed state (i.e., the holder 121 is in a fixed state) and the imaging unit 13 is configured to be movable (see FIG. 2). Since the imaging device 10 having such a configuration is adopted, in step S110, the position of the imaging unit 13 is adjusted by the operation of the camera driving mechanism 14, based on the amount of parallel displacement calculated in step S70 (the position of the imaging unit 13 moves).

After adjusting the image capturing start position, an image of the well plate 20 is captured by the imaging unit 13 so that desired image data for observing samples such as cells, etc., can be obtained (step S120). In the present embodiment, by the operation of the camera driving mechanism 14, the imaging unit 13 performs image capturing while moving in a direction of the angle calculated in step S70 with respect to the X-axis.

As described above, after adjusting the image capturing start position based on the amount of parallel displacement calculated in step S70, image capturing is performed while the imaging unit 13 is allowed to move in an oblique direction with respect to an original scann movement direction, according to the angle calculated in step S70.

Note that, in the present embodiment, an adjusting step is implemented by step S110 and a sample container's image capturing step is implemented by step S120.

<4. Effects>

According to the present embodiment, the actual center coordinates of two wells (positional displacement detection wells) 21 used to detect positional displacement of the well plate 20 are calculated based on temporary edge coordinates detected by applying the rectangular separability filter 40 to captured images of regions near edges. Here, the coordinates of a center position of the rectangular separability filter 40 obtained when a peak value of the separability is obtained in a process using the rectangular separability filter 40 serve as temporary edge coordinates. Regardless of the states of cells or culture fluid in a well 21, the maximum separability is obtained when the center position of the rectangular separability filter 40 is present near the edge of the well 21. Therefore, when similar positional displacement has occurred, regardless of the states of cells or culture fluid in the well 21, certain coordinates are detected as temporary edge coordinates. That is, even if stable captured images cannot be obtained due to the differences in the amount of culture fluid between image capturing targets, the growth of cells, etc., temporary edge coordinates are detected with high accuracy. Since the actual center coordinates of the two positional displacement detection wells are found based on such temporary edge coordinates, the amount of positional displacement is calculated with high accuracy. In addition, captured images that are required to detect positional displacement are only captured images of regions near the edges at eight locations in total, and a process using a template image is not performed in a positional displacement detection process. Hence, positional displacement can be detected at high speed without increasing the amount of data required for a process. As described above, according to the present embodiment, it becomes possible to detect positional displacement of the well plate 20 placed in the holder 121 of the imaging device 10, at high speed and with high accuracy without increasing the amount of data required for a process.

In addition, after the positional displacement detection process ends, original image capturing for observing samples such as cells, etc., is performed considering the positional displacement of the well plate 20. Hence, even if positional displacement has occurred upon the placement of the well plate 20 in the holder 121 by the operator, a desired captured image can be obtained without performing wasteful image capturing.

In addition, although cells, etc., may be damaged in a case in which placement of the well plate 20 in the holder 121 is redone when positional displacement has occurred, image capturing by the imaging unit 13 is performed without moving the well plate 20 when positional displacement has occurred in the present embodiment. Therefore, even if positional displacement has occurred upon the placement of the well plate 20 in the holder 121 by the operator, a desired captured image can be obtained without damaging cells, etc.

<5. Variants>

In the above-described embodiment, the stage 12 is in a fixed state (i.e., the holder 121 is in a fixed state) and the imaging unit 13 is configured to be movable. Hence, image capturing considering positional displacement is performed by adjusting the position of the imaging unit 13 (image capturing start position) and then allowing the imaging unit 13 to move in an oblique direction with respect to an original scan movement direction. However, the present invention is not limited thereto. Hence, with reference to FIG. 22, variants for image capturing considering positional displacement will be described below.

<5.1 First Variant>

In an imaging device according to the present variant, the stage 12 on which the well plate 20 is placed is configured to be movable and rotatable (in other words, the holder 121 is configured to be movable and rotatable), and the imaging unit 13 is in a fixed state. In such a configuration, after a positional displacement detection process ends, first, a process of adjusting the state of the imaging device 10 to a state for starting image capturing is performed (step S110). Specifically, rotation of the stage 12 (rotation of the holder 121) is performed based on an angle calculated in the positional displacement detection process, and movement of the stage 12 (movement of the holder 121) is performed based on the amount of parallel displacement calculated in the positional displacement detection process. Thereafter, an image of the well plate 20 is captured by the imaging unit 13 (step S120).

At that time, the stage 12 (the holder 121) moves in the X-axis direction or the Y-axis direction. In this manner, image capturing is performed while the stage 12 (the holder 121) is allowed to move relative to the imaging unit 13.

<5.2 Second Variant>

In an imaging device according to the present variant, the stage 12 on which the well plate 20 is placed is configured to be movable and rotatable (in other words, the holder 121 is configured to be movable and rotatable), and the imaging unit 13 is configured to be movable. In such a configuration, after a positional displacement detection process ends, first, in the same manner as in the above-described first variant, rotation and movement of the stage 12 (rotation and movement of the holder 121) are performed (step S110). Thereafter, an image of the well plate 20 is captured by the imaging unit 13 (step S120). At that time, in the present variant, the imaging unit 13 moves in the X-axis direction or the Y-axis direction.

DESCRIPTION OF REFERENCE CHARACTERS

10: IMAGING DEVICE
11: LIGHT SOURCE
12: STAGE
13: IMAGING UNIT
14: CAMERA DRIVING MECHANISM
15: CONTROL UNIT
20: WELL PLATE
21: WELL
40: RECTANGULAR SEPARABILITY FILTER
121: HOLDER
μ: SEPARABILITY

The invention claimed is:

1. A method of detecting positional displacement of a sample container, the method detecting an amount of positional displacement of a sample container having a plurality of sample storage portions from an ideal placement state for when the sample container is placed in a sample container holding portion of an imaging device, and the method comprising:

a sample storage portion selecting step of selecting two sample storage portions from among the plurality of sample storage portions, as positional displacement detection sample storage portions;

a logical edge coordinates calculating step of calculating logical edge coordinates for each positional displacement detection sample storage portion, the logical edge coordinates being coordinates of an upper edge, a lower edge, a left edge, and a right edge in the ideal placement state;

an image capturing step of performing image capturing of a predetermined range with each set of logical edge coordinates being a center position, the each set of logical edge coordinates being calculated in the logical edge coordinates calculating step;

a temporary edge coordinates detecting step of applying, for each positional displacement detection sample storage portion, a separability filter to each of captured images of an upper edge side, a lower edge side, a left edge side, and a right edge side obtained by the image capturing in the image capturing step, while shifting a center position of the separability filter, and detecting, for each captured image, coordinates of the center position of the separability filter obtained when a peak value of a separability is obtained, as temporary edge coordinates, the separability filter finding a separability between two regions;

a center coordinates calculating step of calculating actual center coordinates for each positional displacement detection sample storage portion, based on the temporary edge coordinates for the upper edge side, the lower edge side, the left edge side, and the right edge side detected in the temporary edge coordinates detecting step; and an amount-of-positional-displacement calculating step of calculating an amount of positional displacement of the sample container from the ideal placement state, based on the center coordinates of each positional displacement detection sample storage portion calculated in the center coordinates calculating step.

2. The method of detecting positional displacement according to claim 1, wherein
the sample container has a rectangular shape, and
when a group of sample storage portions arranged in line in a longitudinal direction of the sample container is defined as a row, in the sample storage portion selecting step, two sample storage portions belonging to a same row and arranged in positions farthest from each other are selected as the positional displacement detection sample storage portions.

3. The method of detecting positional displacement according to claim 1, wherein in the temporary edge coordinates detecting step, a rectangular separability filter that finds a separability between two rectangular regions is used as the separability filter.

4. The method of detecting positional displacement according to claim 3, wherein
in the temporary edge coordinates detecting step,
when detecting temporary edge coordinates for the upper edge side or the lower edge side of each positional displacement detection sample storage portion, a separability is found while allowing a center position of the rectangular separability filter to move on a straight line that connects logical edge coordinates for the upper edge side of the positional displacement detection sample storage portion to logical edge coordinates for the lower edge side of the positional displacement detection sample storage portion, and
when detecting temporary edge coordinates for the left edge side or the right edge side of the positional displacement detection sample storage portion, a separability is found while allowing the center position of the rectangular separability filter to move on a straight line that connects logical edge coordinates for the left edge side of the positional displacement detection sample storage portion to logical edge coordinates for the right edge side of the positional displacement detection sample storage portion.

5. The method of detecting positional displacement according to claim 1, wherein in the amount-of-positional-displacement calculating step, an amount of parallel displacement and an angle are calculated as the amount of positional displacement, the amount of parallel displacement representing a magnitude of displacement between a predetermined reference position of the sample container in the ideal placement state and the reference position of the sample container in a state in which the sample container is actually placed in the sample container holding portion, and the angle representing an inclination of the sample container in the state in which the sample container is actually placed in the sample container holding portion, with respect to the ideal placement state.

6. The method of detecting positional displacement according to claim 5, wherein when one of the two sample storage portions selected in the sample storage portion selecting step is defined as a first positional displacement detection sample storage portion and another is defined as a second positional displacement detection sample storage portion, center coordinates of the first positional displacement detection sample storage portion and center coordinates of the second positional displacement detection sample storage portion in the ideal placement state are defined as first ideal center coordinates and second ideal center coordinates, respectively, and the center coordinates of the first positional displacement detection sample storage portion and the center coordinates of the second positional displacement detection sample storage portion calculated in the center coordinates calculating step are defined as first actual center coordinates and second actual center coordinates, respectively, in the amount-of-positional-displacement calculating step, an amount of parallel displacement and an angle are calculated as the amount of positional displacement, the amount of parallel displacement representing a magnitude of displacement between the first ideal center coordinates and the first actual center coordinates, and the angle being formed by a straight line that connects the first ideal center coordinates to the second ideal center coordinates and a straight line that connects the first actual center coordinates to the second actual center coordinates.

7. The method of detecting positional displacement according to claim 1, wherein when there is a captured image with which a peak value of the separability cannot be normally obtained in the temporary edge coordinates detecting step, the imaging device displays an alert.

8. An image capturing method for capturing an image of a sample container having a plurality of sample storage portions by an imaging device, the image capturing method comprising:
an adjusting step of adjusting a state of the imaging device to a state for starting image capturing, based on an amount of positional displacement obtained using a method of detecting positional displacement according to claim 1; and
a sample container's image capturing step of capturing an image of the sample container.

9. The image capturing method according to claim 8, wherein
an imaging unit provided in the imaging device is configured to be movable,
in an amount-of-positional-displacement calculating step, an amount of parallel displacement and an angle are calculated as the amount of positional displacement, the amount of parallel displacement representing a magnitude of displacement between a predetermined reference position of the sample container in an ideal placement state and the reference position of the sample container in a state in which the sample container is actually placed in a sample container holding portion, and the angle representing an inclination of the sample container in the state in which the sample container is actually placed in the sample container holding portion, with respect to the ideal placement state,
in the adjusting step, an image capturing start position of the imaging unit is adjusted based on the amount of parallel displacement calculated in the amount-of-positional-displacement calculating step, and
in the sample container's image capturing step, an image of the sample container is captured while allowing the imaging unit to move according to the angle calculated in the amount-of-positional-displacement calculating step.

10. The image capturing method according to claim 8, wherein the sample container holding portion is configured to be movable and rotatable, in the amount-of-positional-displacement calculating step, an amount of parallel displacement and an angle are calculated as the amount of positional displacement, the amount of parallel displacement representing a magnitude of displacement between a predetermined reference position of the sample container in an ideal placement state and the reference position of the sample container in a state in which the sample container is actually placed in the sample container holding portion, and the angle representing an inclination of the sample container in the state in which the sample container is actually placed in the sample container holding portion, with respect to the ideal placement state, in the adjusting step, rotation of the sample container holding portion is performed based on the angle calculated in the amount-of-positional-displacement calculating step, and movement of the sample container holding portion is performed based on the amount of parallel displacement calculated in the amount-of-positional-displacement calculating step, and in the sample container's image capturing step, an image of the sample container is captured while allowing the sample container holding portion to move relative to an imaging unit provided in the imaging device.

11. The image capturing method according to claim 8, wherein an imaging unit provided in the imaging device is configured to be movable, the sample container holding portion is configured to be movable and rotatable, in the amount-of-positional-displacement calculating step, an amount of parallel displacement and an angle are calculated as the amount of positional displacement, the amount of parallel displacement representing a magnitude of displacement between a predetermined reference position of the sample container in an ideal placement state and the reference position of the sample container in a state in which the sample container is actually placed in the sample container holding portion, and the angle representing an inclination of the sample container in the state in which the sample container is actually placed in the sample container holding portion, with respect to the ideal placement state, in the adjusting step, rotation of the sample container holding portion is performed based on the angle calculated in the amount-of-positional-displacement calculating step, and movement of the sample container holding portion is performed based on the amount of parallel displacement calculated in the amount-of-positional-displacement calculating step, and in the sample container's image capturing step, an image of the sample container is captured while allowing the imaging unit to move.

12. A sample container positional displacement detecting device that detects an amount of positional displacement of a sample container having a plurality of sample storage portions from an ideal placement state for when the sample container is placed in a sample container holding portion, the device comprising:

a sample storage portion selecting means for selecting two sample storage portions from among the plurality of sample storage portions, as positional displacement detection sample storage portions;

a logical edge coordinates calculating means for calculating logical edge coordinates for each positional displacement detection sample storage portion, the logical edge coordinates being coordinates of an upper edge, a lower edge, a left edge, and a right edge in the ideal placement state;

an image capturing means for performing image capturing of a predetermined range with each set of logical edge coordinates being a center position, the each set of logical edge coordinates being calculated by the logical edge coordinates calculating means;

a temporary edge coordinates detecting means for applying, for each positional displacement detection sample storage portion, a separability filter to each of captured images of an upper edge side, a lower edge side, a left edge side, and a right edge side obtained by the image capturing by the image capturing means, while shifting a center position of the separability filter, and detecting, for each captured image, coordinates of the center position of the separability filter obtained when a peak value of a separability is obtained, as temporary edge coordinates, the separability filter finding a separability between two regions;

a center coordinates calculating means for calculating actual center coordinates for each positional displacement detection sample storage portion, based on the temporary edge coordinates for the upper edge side, the lower edge side, the left edge side, and the right edge side detected by the temporary edge coordinates detecting means; and an amount-of-positional-displacement calculating means for calculating an amount of positional displacement of the sample container from the ideal placement state, based on the center coordinates of each positional displacement detection sample storage portion calculated by the center coordinates calculating means.

* * * * *